US009122043B2

(12) United States Patent
Kawana

(10) Patent No.: US 9,122,043 B2
(45) Date of Patent: Sep. 1, 2015

(54) PROJECTION ZOOM LENS AND PROJECTION TYPE DISPLAY DEVICE

(71) Applicant: FUJIFILM Corporation, Tokyo (JP)

(72) Inventor: Masanao Kawana, Saitama-ken (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 14/336,472

(22) Filed: Jul. 21, 2014

(65) Prior Publication Data
US 2014/0327888 A1 Nov. 6, 2014

Related U.S. Application Data

(63) Continuation of application No. PCT/JP2013/000183, filed on Jan. 17, 2013.

(30) Foreign Application Priority Data

Jan. 20, 2012 (JP) ................ 2012-009676

(51) Int. Cl.
G02B 15/177 (2006.01)
G02B 15/16 (2006.01)
G02B 13/16 (2006.01)
G03B 21/14 (2006.01)

(52) U.S. Cl.
CPC .............. *G02B 15/161* (2013.01); *G02B 13/16* (2013.01); *G02B 15/177* (2013.01); *G03B 21/142* (2013.01)

(58) Field of Classification Search
CPC ...... G02B 15/177; G02B 13/04; G02B 13/16; G02B 15/14; G02B 13/0045

USPC .......... 359/649–653, 680–682, 691
See application file for complete search history.

(56) References Cited

U.S. PATENT DOCUMENTS

RE39,911 E * 11/2007 Moskovich ................ 359/651
8,570,661 B2 * 10/2013 Lee et al. .................. 359/682
2008/0094727 A1 4/2008 Kang et al.
(Continued)

FOREIGN PATENT DOCUMENTS

JP 2007-212743 8/2007
JP 2008-107798 5/2008
(Continued)

OTHER PUBLICATIONS

International Search Report, PCT/JP2013/000183, Jun. 4, 2013.

*Primary Examiner* — Scott J Sugarman
(74) *Attorney, Agent, or Firm* — Young & Thompson

(57) ABSTRACT

A projection zoom lens substantially consists of a negative first lens group and a positive second lens group, in this order from the magnification side. The first lens group substantially consists of a first lens which is a negative meniscus lens with a convex surface toward the magnification side. The second lens group substantially consists of a positive second lens, a third lens which is a positive meniscus lens with a convex surface toward the magnification side, a negative fourth lens, and a positive fifth lens, in this order from the magnification side. The first lens group and the second lens group move along the direction of the optical axis while changing magnification. At least one of the positive lenses within the entire system has an Abbe number and a refractive index within a predetermined range. The refractive indices of the first to third lenses satisfy a predetermined conditional expression.

4 Claims, 7 Drawing Sheets

(56) References Cited

U.S. PATENT DOCUMENTS

2011/0013071 A1* 1/2011 Lin .............................. 348/345
2012/0182626 A1 7/2012 Liu et al.

FOREIGN PATENT DOCUMENTS

| JP | 2010-113150 | 5/2010 |
| JP | 2012-150452 | 8/2012 |

* cited by examiner

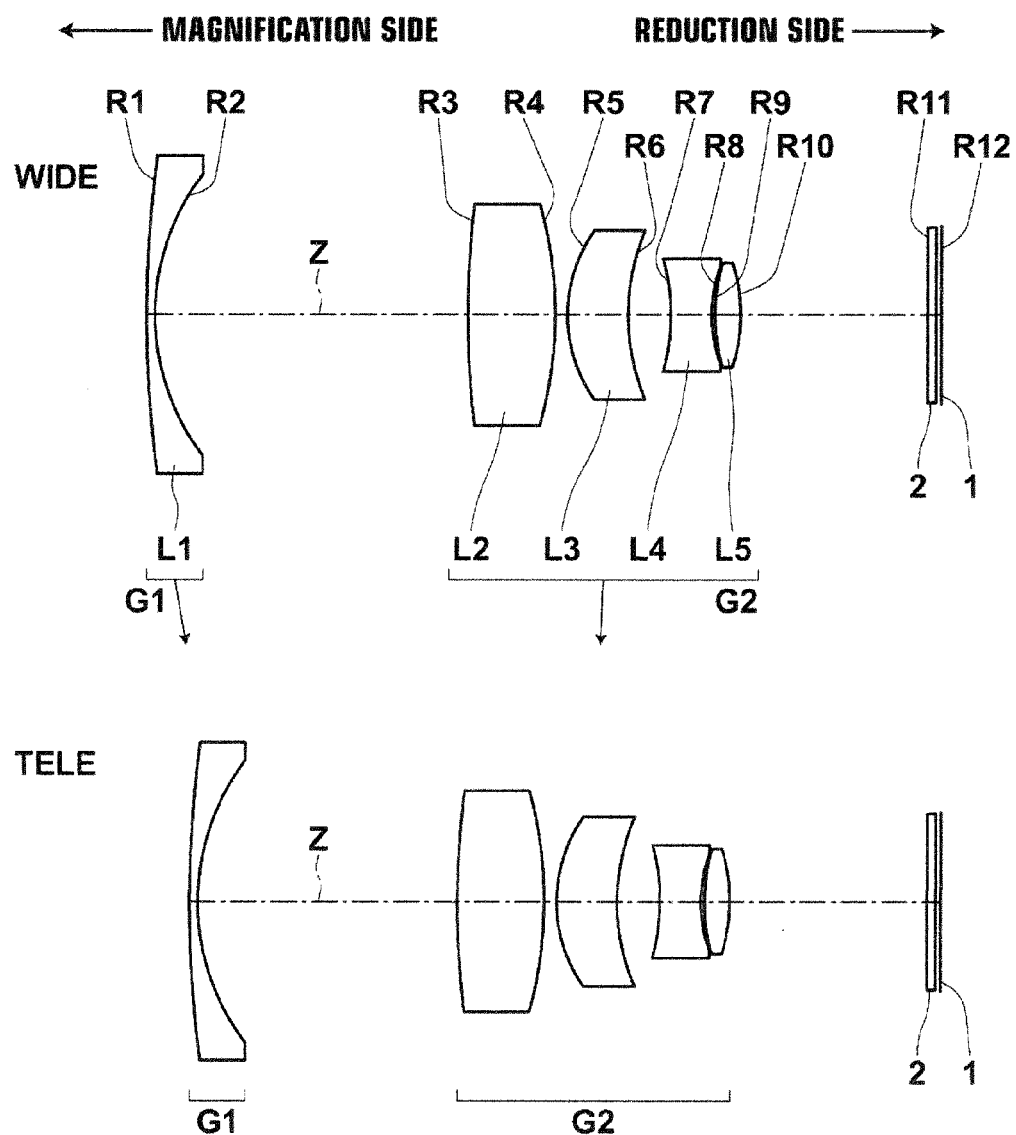

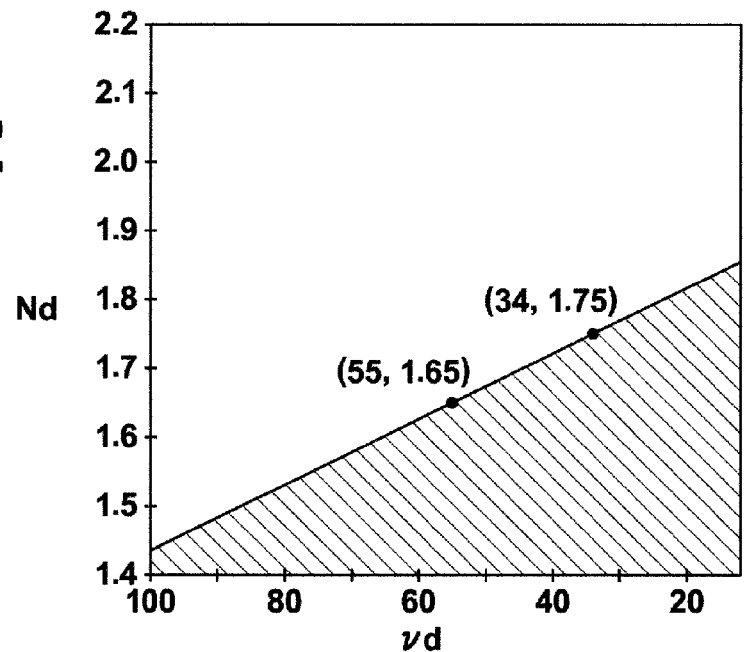
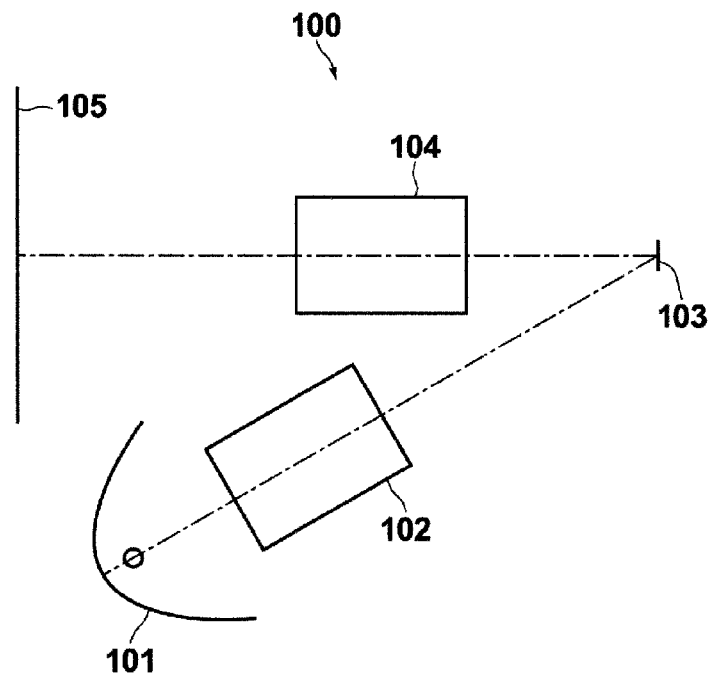

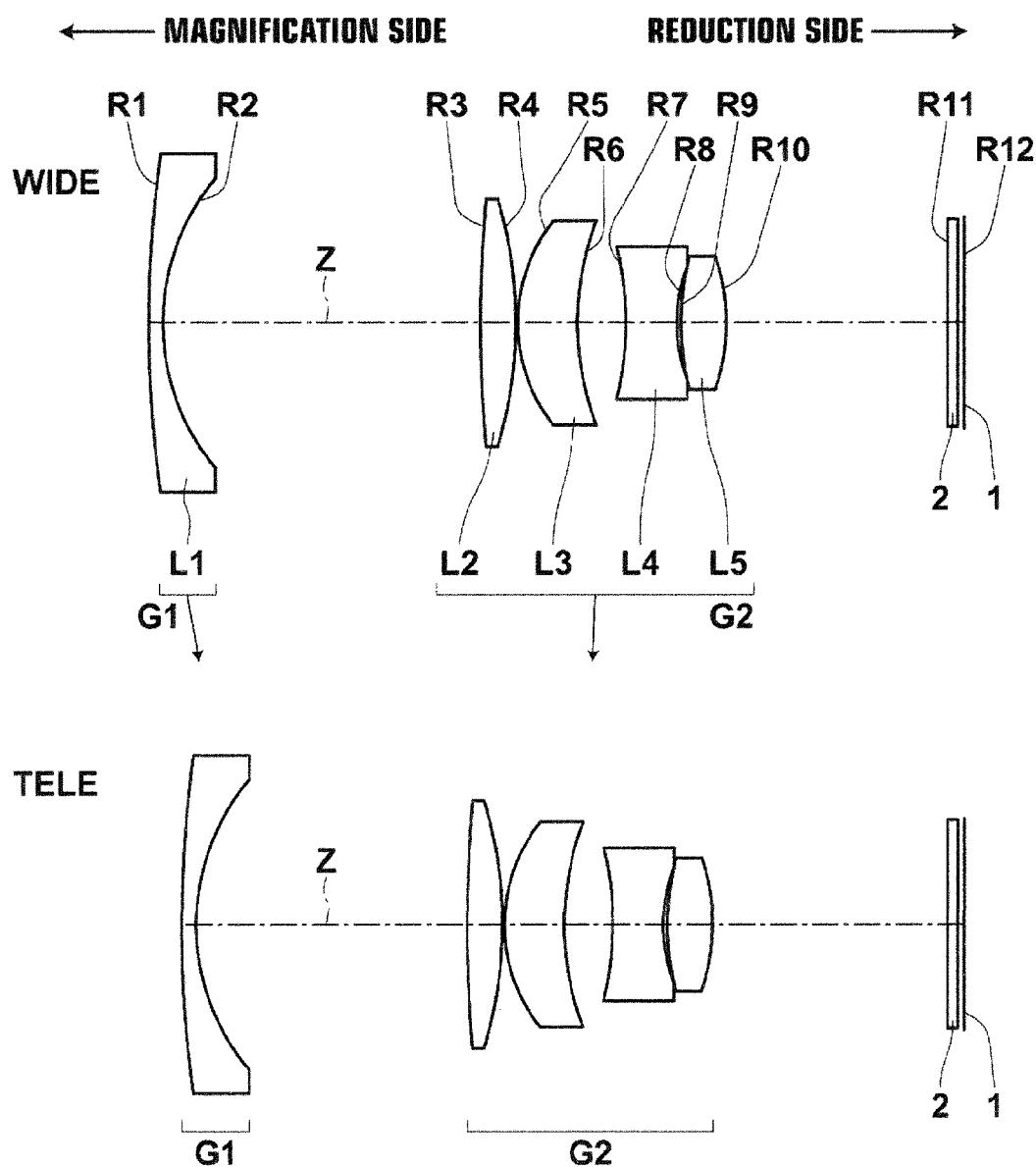

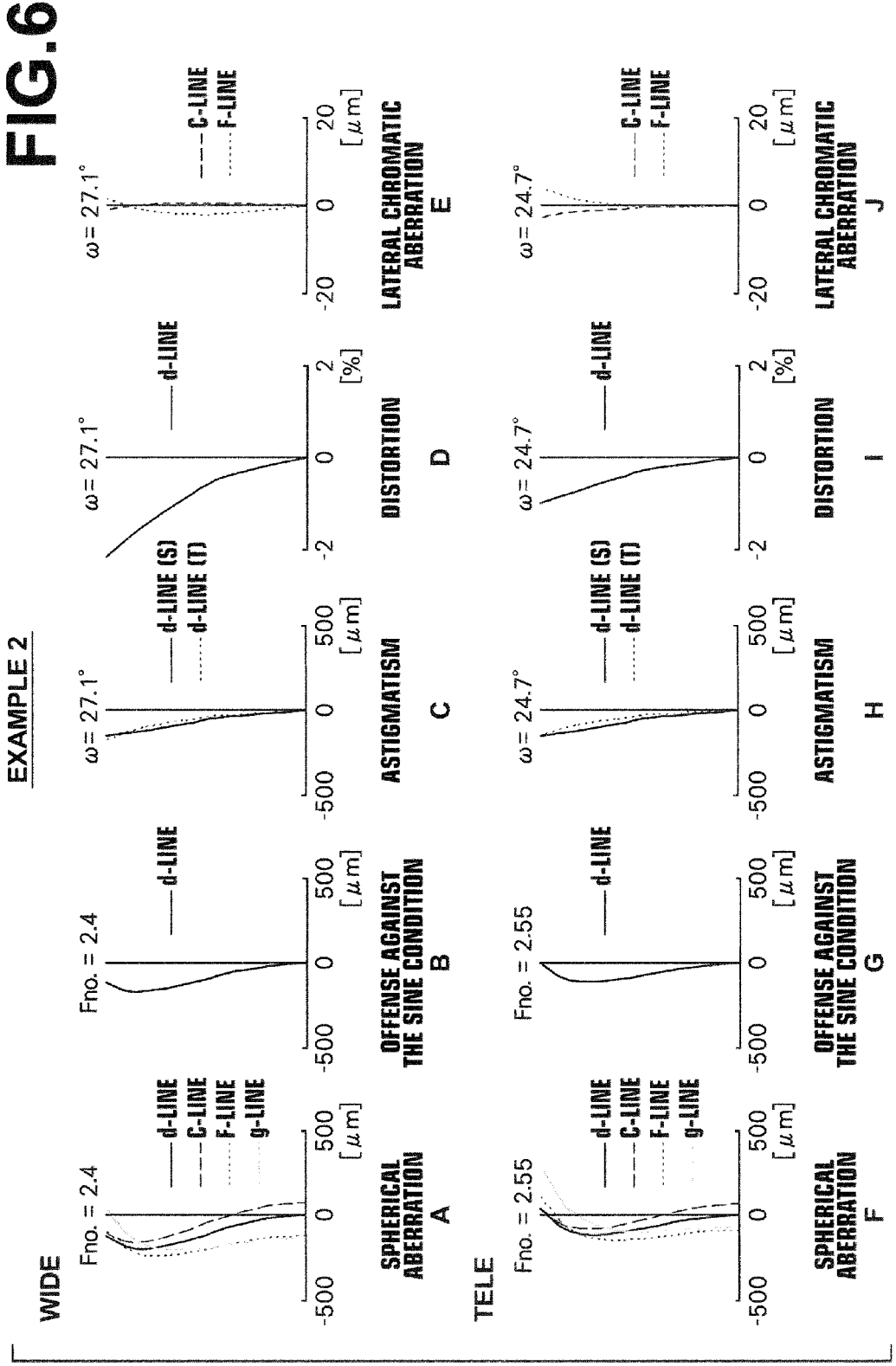

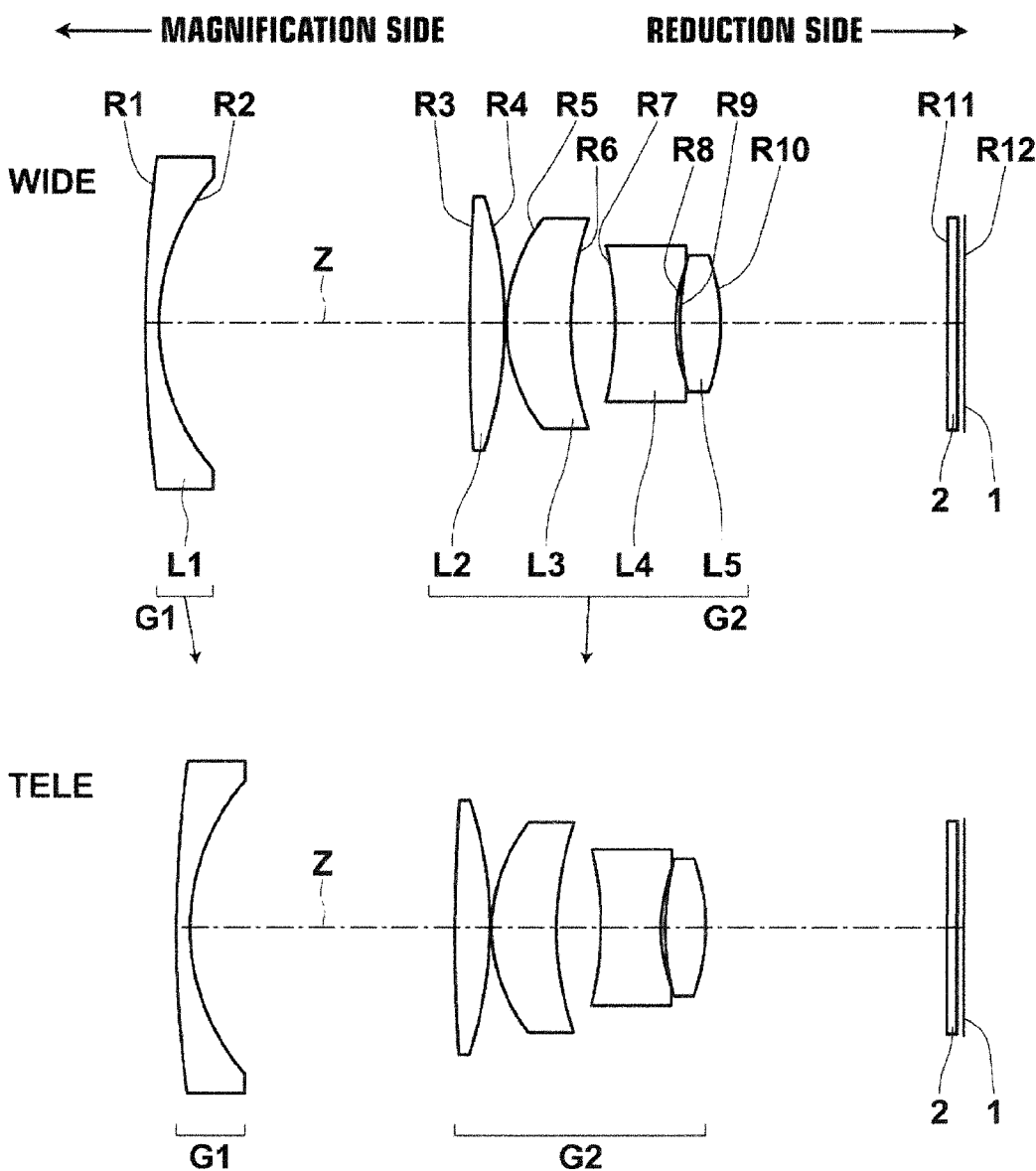

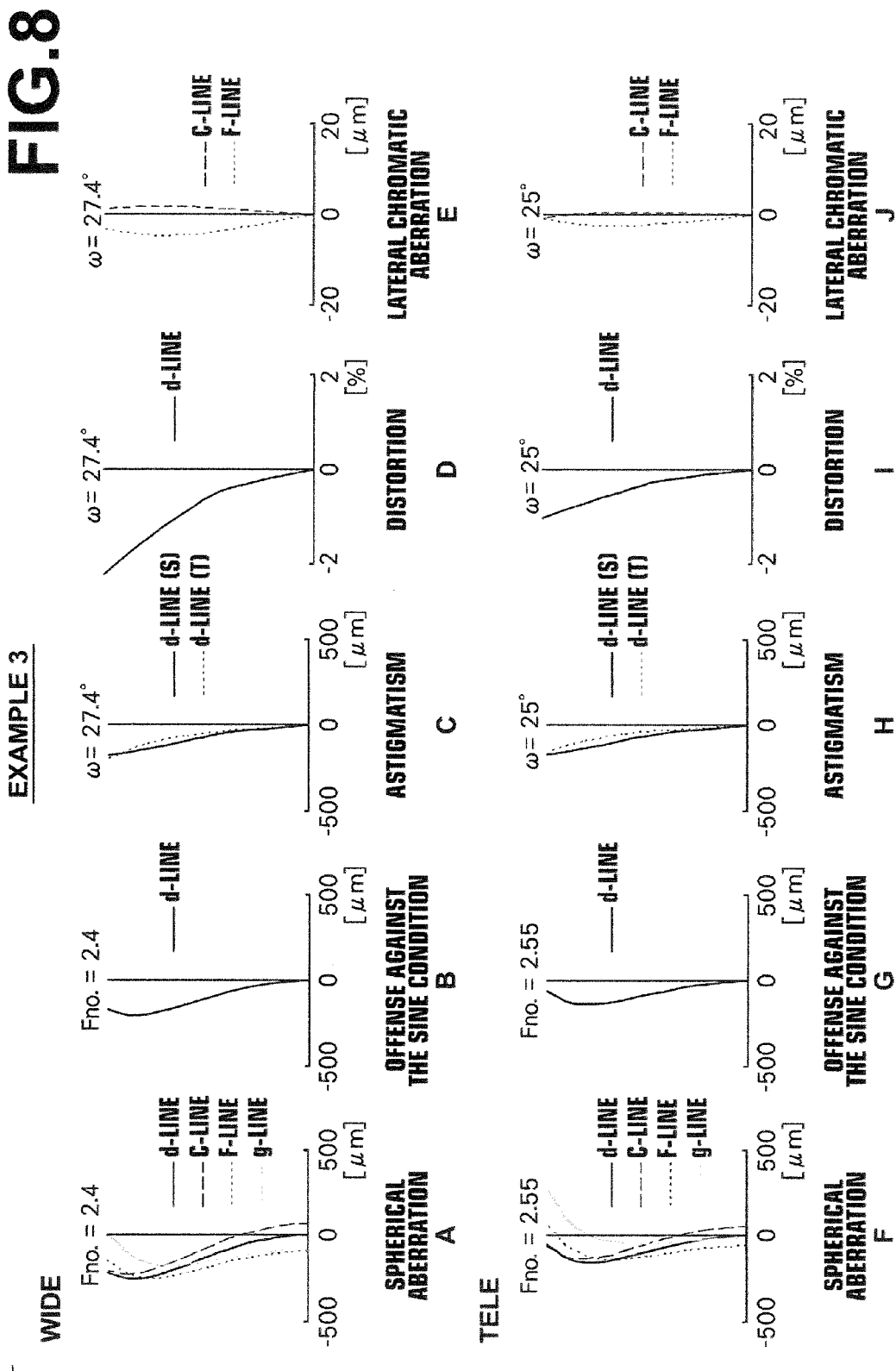

PROJECTION ZOOM LENS AND PROJECTION TYPE DISPLAY DEVICE

CROSS-REFERENCE TO RELATED APPLICATIONS

This application is a Continuation of PCT International Application No. PCT/JP2013/000183 filed on Jan. 17, 2013, which claims priority under 35 U.S.C. §119 (a) to Japanese Patent Application No. 2012-009676 filed Jan. 20, 2012. Each of the above application(s) is hereby expressly incorporated by reference, in its entirety, into the present application.

BACKGROUND OF THE INVENTION

1. Field of the Invention

The present invention relates to a projection zoom lens and a projection type display device, and for example, to a projection zoom lens suitable for enlarging and projecting a light beam that carries video information from a light valve onto a screen and a projection type display device including this lens.

2. Description of the Related Art

Conventionally, projection type projector devices (projection type display devices) that utilize a light valve, such as liquid crystal display elements, DMD's (Digital Micromirror Device: registered trademark), or the like, have been commonly available. In recent years, presentations using such projection type display devices have been popularly performed as a result of the rapid progress of miniaturization and high definition of light valves as well as the spread of personal computers. Under these circumstances, the demand for compact projection type display devices which have a superior portability while having excellent projection performance is increasing, and accordingly projection lenses are being expected to be configured to be compact while keeping high performance. With increasing competition in development, more cost reduction is becoming strongly desired, in addition to the above demands.

Known projection lenses having a compact configuration, which can be used for the projection type display devices, include lens systems which substantially consists of two lens groups: a first lens group having negative refractive power and a second lens group having positive refractive power are arranged in this order from the magnification side and which are composed of five lenses in total, as disclosed in Japanese Unexamined Patent Publication No. 2008-107798 and Japanese Unexamined Patent Publication No. 2010-113150, for example.

SUMMARY OF THE INVENTION

However, the projection lens disclosed in Japanese Unexamined Patent Publication No. 2008-107798 has room for improvement with respect to correction of various aberrations in order to be compatible with recent light valves in which high definition has advanced. The projection lens disclosed in Japanese Unexamined Patent Publication No. 2010-113150 has a small size and high performance. However, in recent years, there is demand for projection lenses to attain lower cost.

The present invention has been developed in view of the above circumstances, and it is an object of the present invention to provide a projection lens which can attain low cost and which can be configured to be compact using a small number of lenses, in which various aberrations including field curvature are excellently corrected so as to have high projection performance, and a projection type display device including the projection lens.

A projection zoom lens of the present invention substantially consists of two lens groups which are a first lens group having negative refractive power and a second lens group having positive refractive power arranged in this order from the magnification side;

the first lens group substantially consists of one lens which is a first lens composed of a negative meniscus lens with a convex surface toward the magnification side;

the second lens group substantially consists of four lenses which are a second lens that is a positive lens, a third lens which is a positive meniscus lens with a convex surface toward the magnification side, a fourth lens which is a negative lens, and a fifth lens which is a positive lens, arranged in this order from the magnification side;

the first lens group and the second lens group are moved in the direction of the optical axis while changing magnification;

at least one of the positive lenses in the entire system has an Abbe number and a refractive index within a range on the side where a refractive index is lower than that of a straight line which passes through two points which are (vd,Nd)=(55, 1.65) and (vd,Nd)=(34,1.75) in an orthogonal coordinate system having Abbe numbers vd with respect to the d-line as the horizontal axis and refractive indices Nd with respect to the d-line as the vertical axis; and conditional expressions (1) through (3) below are satisfied:

$$Nd1 < 1.70 \qquad (1)$$

$$Nd2 > 1.65 \qquad (2)$$

$$Nd3 > 1.65 \qquad (3), \text{where}$$

Nd1: the refractive index with respect to the d-line of the first lens,

Nd2: the refractive index with respect to the d-line of the second lens, and

Nd3: the refractive index with respect to the d-line of the third lens.

A projection type display apparatus according to the present invention includes a light source; a light valve into which light from the light source enters; and the projection zoom lens of the present invention as described above as a projection zoom lens which projects an optical image formed by the light optically modulated by the light valve onto a screen.

Note that the above expression "the magnification side" means a side toward which images are projected (a screen side), and the screen side is referred to as the magnification side in the case of reduced projection as well, for the sake of convenience. The above expression "reduction side" means an original-image display region side (a light valve side), and the light valve side is referred to as the reduction side in the case of reduced projection as well, for the sake of convenience.

Note that the above expression "lens group" is not necessarily constituted by a plurality of lenses, and includes those that are constituted by a single lens.

Note that the above expression "substantially consists of" intends to mean that the projection zoom lens may include lenses substantially without any power; optical elements other than lenses such as aperture stops, cover glass, filters, and the like; and mechanical components such as lens flanges, lens barrels, imaging elements, image stabilization mechanisms, and the like; in addition to the lens groups or lenses which are listed as constituent elements.

The surface shapes and the signs of the refractive powers of the above lenses should be considered in paraxial regions if aspheric surfaces are included therein.

Since the projection zoom lens of the present invention is constituted by five lenses, which is a small number of lenses, arranged in the entire system, cost reduction and miniaturization can be achieved. Further, in a lens system in which a negative first lens group and a positive second lens group are arranged in this order from the magnification side; and these two lenses are configured to be moved in the direction of the optical axis while changing magnification, the projection zoom lens of the present invention suitably sets refractive power, shapes, refractive indexes, and the Abbe numbers of lenses which are constituent elements. Accordingly, the zoom lens can be configured to be compact, various aberrations including field curvature can be excellently corrected, and lower cost can be achieved.

The projection type display apparatus of the present invention includes the projection zoom lens of the present invention, thereby having excellent projection performance and enabling a compact and low-cost configuration.

BRIEF DESCRIPTION OF THE DRAWINGS

FIG. 1 is a collection of cross-sectional views of a projection zoom lens according to Example 1 of the present invention, illustrating the lens configuration thereof.

FIG. 2 is a coordinate diagram of Abbe numbers and refractive indices, for explaining materials of positive lenses included in the projection zoom lens according to embodiments of the present invention.

FIG. 3 is a schematic configuration diagram of a projection type display apparatus according to one embodiment of the present invention.

Figure 4:
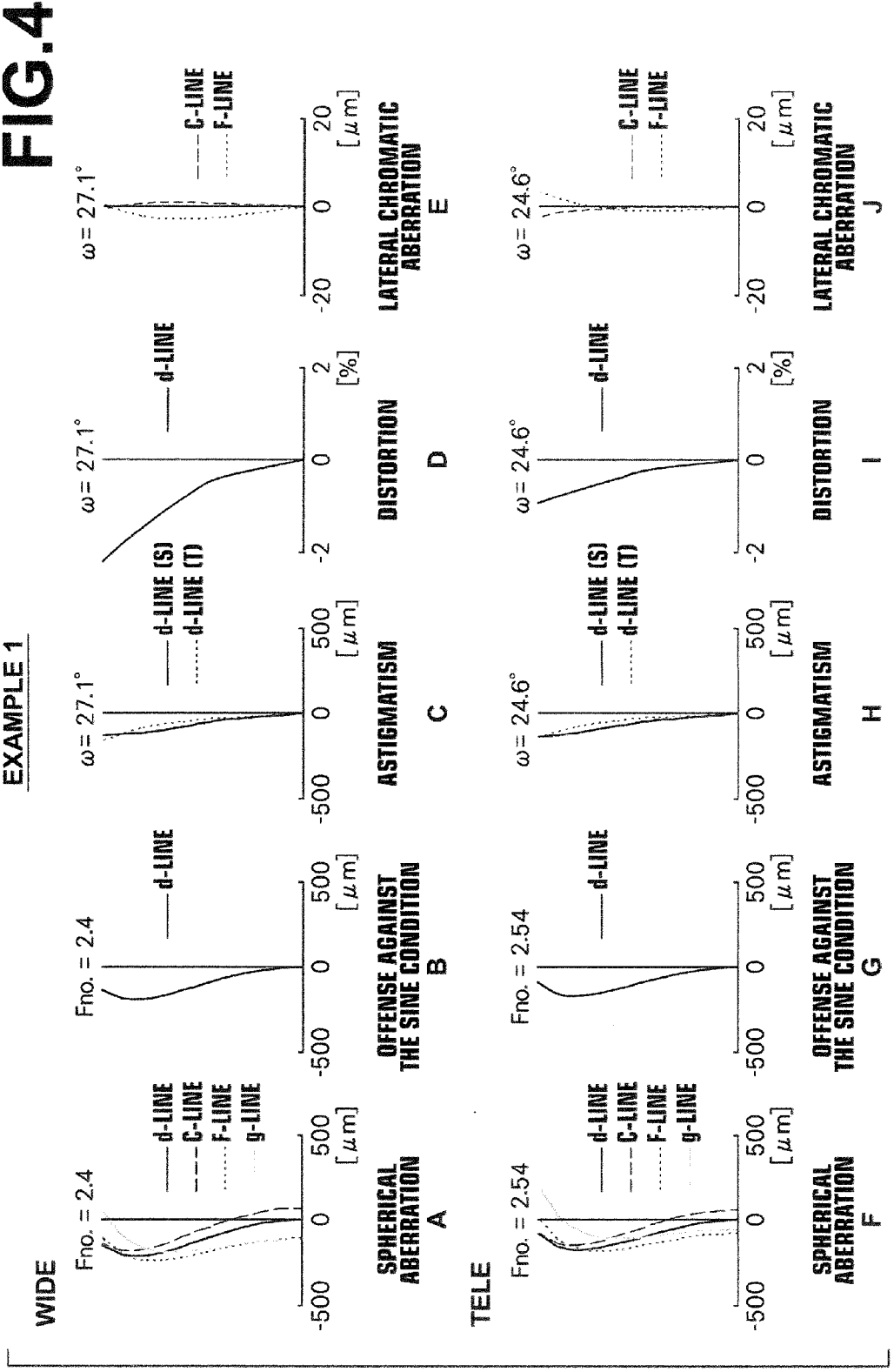

A through J of FIG. 4 are aberration diagrams of the projection zoom lens of Example 1 of the present invention.

FIG. 5 is a collection of cross-sectional views of a projection zoom lens according to Example 2 of the present invention, illustrating the lens configuration thereof.

A through J of FIG. 6 are aberration diagrams of the projection zoom lens of Example 2 of the present invention.

FIG. 7 is a collection of cross-sectional views of a projection zoom lens according to Example 3 of the present invention, illustrating the lens configuration thereof.

A through J of FIG. 8 are aberration diagrams of the projection zoom lens of Example 3 of the present invention.

DESCRIPTION OF THE PREFERRED EMBODIMENTS

Hereinafter, embodiments of the present invention will be described in detail with reference to the accompanying drawings. FIG. 1 is a collection of cross-sectional views of a projection zoom lens according to one embodiment of the present invention, including the optical axis Z. The example of configurations shown in FIG. 1 corresponds to the projection zoom lens of Example 1 to be described later.

This projection zoom lens is mounted on a projection type display apparatus, for example, and can be used as a projection lens which projects image information displayed on a light valve onto a screen. In FIG. 1, the left side of the diagram is designated as a magnification side, and the right side thereof is designated as a reduction side. Further, supposing a case that the projection zoom lens is mounted on the projection type display device, FIG. 1 also shows a parallel plate optical member 2, which presumes various types of filters, a cover glass, and the like; and an image display surface 1 of a light valve.

In the projection type display device, a light beam which has been provided with image information at the image display surface 1 enters this projection zoom lens via the optical member 2, and the projection zoom lens projects the light beam onto a screen (not shown) disposed toward the left side direction of the drawing sheet.

Note that although FIG. 1 shows a single image display surface 1, the projection type display apparatus can be configured such that a light beam from the light source is divided into three original colors by a color separation optical system and a full color image can be displayed by disposed three light valves for the respective original colors.

The projection zoom lens according to the present embodiment substantially consists of two lens groups which are a first lens group G1 having negative refractive power and a second lens group G2 having positive refractive power arranged in this order from the magnification side. The first lens group G1 and the second lens group G2 are moved in the direction of the optical axis while changing magnification.

The upper stage and the lower stage of FIG. 1 respectively show lens arrangements of this projection zoom lens at the wide angle end and at the telephoto end. The projection zoom lens of the example of FIG. 1 is configured such that while changing magnification from the wide angle end to the telephoto end, the first lens group G1 moves toward the reduction side and the second lens group G2 moves toward the magnification side as schematically indicated by the arrows in FIG. 1.

The first lens group G1 substantially consists of one lens which is a first lens L1 composed of a negative meniscus lens with a convex surface toward the magnification side. The second lens group substantially consists of four lenses which are a second lens L2 which is a positive lens, a third lens L3 which is a positive meniscus lens with a convex surface toward the magnification side, a fourth lens L4 which is a negative lens, and a fifth lens L5 which is a positive lens arranged in this order from the magnification side.

For example, in the example of FIG. 1, the lens L2 is a biconvex lens, the lens L3 is a positive meniscus lens with a convex surface toward the magnification side, the lens L4 is a biconcave lens, and the lens L5 is a biconvex lens; and all the lenses in the entire system are single lenses, which are not cemented to each other and are spherical lenses.

This projection zoom lens is a retrofocus type optical system as a negative lens group and a positive lens group are arranged in this order from the magnification side therein. This is advantageous from the viewpoint of achieving a wider angle of view and securing a long back focus which is necessary for arranging a light beam separation optical system and the like.

By configuring the first lens group G1, the lens diameter of which is likely to become large, to be a single negative meniscus lens, the lens can be produced at low cost. In addition, the lens can be configured to be lightweight so that the burden on a driving system which operates while changing magnification can be reduced and the apparatus can be advantageously produced at a lower cost and a smaller size.

Note that the first lens group G1 can be caused to function as a focusing group which performs focus adjustment by moving in the direction of the optical axis when the projection distance is changed. In this case as well, by configuring the first lens group G1 to be of a single lens configuration, the burden on the driving system can be advantageously reduced.

In addition to the above configuration of the first lens group G1, by configuring the second through fifth lenses L2 through L5 of the second lens group G2 as described above, the lens system can be advantageously compact and realize a small F-number which is necessary for projection optical systems, enabling excellent correction of aberrations.

In particular, this projection zoom lens can be of a simple configuration and be manufactured at low cost as the entire system uses five lenses which is a small number of lenses. As shown in the example of FIG. 1, in the case that all the lenses of the entire system are single lenses which are not cemented to each other and are spherical lenses, this is more advantageous from the viewpoint of cost.

Further, this projection zoom lens is configured such that at least one of the positive lenses in the entire system has an Abbe number and a refractive index within a range (the range indicated by hatching in FIG. 2) on the side where a refractive index is lower than that of a straight line which passes through two points which are (νd,Nd)=(55,1.65) and (νd,Nd)=(34, 1.75) in an orthogonal coordinate system having Abbe numbers νd with respect to the d-line as the horizontal axis and refractive indices Nd with respect to the d-line as the vertical axis, as shown in FIG. 2.

In the lens system, in which a negative lens group and a positive lens group are arranged in this order from the magnification side and which is composed of the first through fifth lenses L1 through L5 as described above, by limiting the selection range of the material of at least one positive lens as described above, the lens system can be manufactured at lower cost and cost reduction can be achieved.

Note that regarding one or more positive lenses which employ materials within the shaded range shown in FIG. 2, if a lens having a large volume is selected therefor, cost reduction can be more effectively achieved. For example, in the example of FIG. 1, the material included within the shaded range of FIG. 2 is used for the second lens L2.

Furthermore, this projection zoom lens is configured to satisfy conditional expressions (1) through (3) below:

$$Nd1 < 1.70 \quad (1)$$

$$Nd2 > 1.65 \quad (2)$$

$$Nd3 > 1.65 \quad (3),$$

where

Nd1: the refractive index with respect to the d-line of the first lens,
Nd2: the refractive index with respect to the d-line of the second lens, and
Nd3: the refractive index with respect to the d-line of the third lens.

By selecting each material of the first through third lenses from the magnification side, in which the ray height of an off-axis ray is relatively high, such that conditional expressions (1) through (3) are satisfied at the same time, field curvature can be excellently corrected. In the case that conditional expressions (1) through (3) are not satisfied at the same time, the absolute value of the Petzval sum will be large and field curvature will be increased.

According to the projection zoom lens of the present embodiment, a lens system, which enables a small F-number required for projection optical systems as well as having high optical performance, and in which various aberrations including field curvature are excellently corrected, using five lenses which is a small number of lenses, can be configured at low cost.

Next, referring to FIG. 3, a projection type display apparatus according to one embodiment of the present invention will be described. FIG. 3 shows the schematic configuration of the projection type display apparatus 100 according to the present embodiment. This projection type display apparatus 100 includes a light source 101, an illumination optical system 102, a DMD 103 as a light valve, and the projection zoom lens 104 according to the embodiment of the present invention.

A light beam emitted from the light source 101 is selectively and time-sequentially converted into light of the three primary colors (R, G, and B) by a color wheel (not shown), and the light quantity distribution is uniformized on a cross section which is vertical to the optical axis of the light beam by the illumination optical system 102 so as to emit the light onto the DMD 103. In the DMD 103, modulation switching for the colors of light is performed according to switching of colors of incident light. The light which has been optically modulated by the DMD 103 enters the projection zoom lens 104. The projection zoom lens 104 projects an optical image formed by the light which has been optically modulated by the DMD 103 onto a screen 105.

Note that the projection type display apparatus of the present invention is not limited to that of FIG. 3, and various modifications are possible. For example, three DMD's which respectively correspond to each color of light may be used to modulate each of the RGB colors at the same time, instead of disposing a single plate DMD. In this case, a color separation/composition prism is disposed between the projection zoom lens 104 and the DMD 103.

Note that other light valves can be employed instead of the DMD 103, and for example, transmissive liquid crystal display elements and reflective liquid crystal display elements can be used as the light valve.

Next, specific Examples of the projection zoom lens of the present invention will be described.

EXAMPLE 1

FIG. 1 shows the lens configuration of the projection zoom lens of Example 1. A description regarding FIG. 1 has been given above, and accordingly redundant descriptions thereof will be omitted.

The schematic configuration of the projection zoom lens of Example 1 is as described below. That is, the projection zoom lens has a two-group configuration in which a first lens group G1 having negative refractive power and a second lens group G2 having positive refractive power are arranged in this order from the magnification side. While changing magnification from the wide angle end to the telephoto end, the first lens group G1 moves toward the reduction side and the second lens group G2 moves toward the magnification side along the optical axis Z as schematically indicated by the arrows in FIG. 1. Focus adjustment is performed by moving the first lens group G1 in the direction of the optical axis when the projection distance is changed.

The first lens group G1 consists of a lens L1 which is composed of a negative meniscus lens with a convex surface toward the magnification side. The second lens group G2 consists of a lens L2 which is a biconvex lens, a lens L3 which is a positive meniscus lens with a convex surface toward the magnification side, a lens L4 which is a biconcave lens, and a lens L5 which is a biconvex lens, in this order from the magnification side. All the lenses are single lenses which are not cemented to each other and are spherical lenses.

Table 1 shows the detailed configuration of the projection zoom lens of Example 1. (a) of Table 1 shows basic lens data of the projection zoom lens of Example 1. In the basic lens data, items in the column Si show the i-th (i=1, 2, 3, . . . )

surface number, the value of i sequentially increasing from the surface on the magnification side of the constituent element at the most-magnification side, which is designated as 1, toward the reduction side. Items in the column Ri show the radius of curvature of the i-th surface (i=1, 2, 3, . . . ), and items in the column Di show the distances between i-th surfaces and (i+1)st surfaces along the optical axis Z. Further, items in the column Ndj show the refractive index of a j-th (j=1, 2, 3, . . . ) constituent element with respect to the d-line (wavelength: 587.6 nm), the value of j sequentially increasing from the constituent element at the most magnification side, which is designated as 1, toward the reduction side. Items in the column νdj show the Abbe number of the j-th constituent element with respect to the d-line.

It should be noted that the sign of the radius of curvature is positive in the case that a surface shape is convex on the magnification side, and negative in the case that the surface shape is convex on the reduction side. The basic lens data shows the optical member 2 as well. The distance between the first lens group G1 and the second lens group G2 and the distance between the second lens group G2 and the optical member 2 change while changing magnification. DD[2] and DD[10] are respectively shown in the columns of the distances between surfaces corresponding to these distances.

Data regarding specs of the projection zoom lens of Example 1 in (b) of Table 1 shows values of a zoom magnification rate (zoom ratio), the focal length f of the entire system, the back focus Bf, the F-number Fno., and the total angle of view 2ω at each of the wide angle end and the telephoto end. Values of the back focus in Table are air converted distances. Further, (b) of Table 1 shows values of the distances between surfaces that change while changing magnification at each of the wide angle end and the telephoto end. In (b) of Table 1, in the case that the projection distance is infinity, DD[2] is written as DD[2] (inf), and in the case that the projection distance is 2.37 m, DD[2] is written as DD[2] (2.37 m).

Note that the specs shown in (b) of Table 1 are related to the d-line, and the specs shown in (b) of Table 1 other than DD[2] (2.37 m) is in the case that the projection distance is infinity. The numerical values of Table 1 are rounded to a predetermined number of digits. In Table 1, mm is used as the unit of length, but other appropriate units may also be used, as optical systems are usable even when they are proportionally enlarged or miniaturized.

TABLE 1

EXAMPLE 1

(a)

| Si | Ri | Di | Ndj | νdj |
|---|---|---|---|---|
| 1 | 151.9699 | 1.00 | 1.67003 | 47.23 |
| 2 | 28.8932 | DD[2] | | |
| 3 | 112.4552 | 10.88 | 1.67003 | 47.23 |
| 4 | −51.2846 | 1.55 | | |
| 5 | 18.5322 | 7.44 | 1.77250 | 49.60 |
| 6 | 26.8465 | 5.34 | | |
| 7 | −26.2428 | 5.12 | 1.80809 | 22.76 |
| 8 | 17.6779 | 0.44 | | |
| 9 | 24.6466 | 3.17 | 1.83400 | 37.16 |
| 10 | −21.0161 | DD[10] | | |
| 11 | ∞ | 1.05 | 1.51680 | 64.20 |
| 12 | ∞ | 0.69 | | |
| 13 | ∞ | | | |

TABLE 1-continued

EXAMPLE 1

(b)

| | Wide Angle End | Telephoto End |
|---|---|---|
| Zoom Ratios | 1.0 | 1.1 |
| f | 22.28 | 24.50 |
| Bf | 24.68 | 25.95 |
| Fno. | 2.40 | 2.54 |
| 2ω[°] | 53.61 | 48.80 |
| DD[2] (inf) | 38.96 | 32.35 |
| DD[2] (2.37 m) | 40.13 | 33.53 |
| DD[10] | 23.29 | 24.55 |

A through E of FIG. 4 respectively show aberration diagrams of spherical aberration, offense against the sine condition, astigmatism, distortion, and lateral chromatic aberration of the projection zoom lens of Example 1 at the wide angle end. F through J of FIG. 4 respectively show aberration diagrams of spherical aberration, offense against the sine condition, astigmatism, distortion, and lateral chromatic aberration of the projection zoom lens of Example 1 at the telephoto end.

The aberration diagrams of A through J of FIG. 4 apply the d-line as a reference, the spherical aberration diagram shows aberrations with respect to the C-line (wavelength: 656.3 nm), the F-line (wavelength: 486.1 nm) and the g-line (wavelength: 435.8 nm) as well, and the lateral chromatic aberration diagram also shows aberrations with respect to the F-line and the C-line. Further, the astigmatism diagram shows aberration in a sagittal direction with a solid line and aberration in a tangential direction with a dotted line. The symbol "Fno.", which is indicated above the vertical axis in the spherical aberration diagram, refers to the F-number, and the symbol "ω", which is indicated above the vertical axis in the other aberration diagrams, refers to a half angle of view. Note that the aberration diagrams in A through J of FIG. 4 are those in the case that the projection distance is 2.37 m.

Values corresponding to conditional expressions (1) through (3) of the projection zoom lens of Example 1 are shown together with those of the other Examples in Table 4 to be shown below.

The manners in which the drawings are shown, the symbols in the Tables, the meanings thereof, the manners in which they are shown, conditions for the projection distance and the wavelength of the specs shown in the Tables and that the aberration diagrams are for a case that the projection distance is 2.37 m with respect to Example 1 above apply to the Examples to be described below, unless otherwise noted.

EXAMPLE 2

FIG. 5 shows the lens configuration of the projection zoom lens of Example 2 at each of the wide angle end and the telephoto end. The schematic configuration of the projection zoom lens of Example 2 is the same as that of Example 1. The detailed configuration of the projection zoom lens of Example 2 is shown in Table 2, and aberration diagrams are respectively shown in A through J of FIG. 6.

TABLE 2

EXAMPLE 2

(a)

| Si | Ri | Di | Ndj | νdj |
|---|---|---|---|---|
| 1 | 131.1194 | 1.50 | 1.67003 | 47.23 |
| 2 | 23.6836 | DD[2] | | |
| 3 | 153.5265 | 3.66 | 1.77250 | 49.60 |
| 4 | −44.9831 | 0.20 | | |
| 5 | 17.2971 | 6.29 | 1.67003 | 47.23 |
| 6 | 30.1714 | 5.16 | | |
| 7 | −33.5518 | 5.36 | 1.78472 | 25.68 |
| 8 | 17.1668 | 0.44 | | |
| 9 | 28.3402 | 4.71 | 1.77250 | 49.60 |
| 10 | −21.6300 | DD[10] | | |
| 11 | ∞ | 1.05 | 1.51680 | 64.20 |
| 12 | ∞ | 0.70 | | |
| 13 | ∞ | | | |

(b)

| | Wide Angle End | Telephoto End |
|---|---|---|
| Zoom Ratios | 1.0 | 1.1 |
| f | 22.19 | 24.41 |
| Bf | 24.68 | 26.10 |
| Fno. | 2.40 | 2.55 |
| 2ω[°] | 53.78 | 48.99 |
| DD[2] (inf) | 33.44 | 28.51 |
| DD[2](2.37 m) | 34.22 | 29.29 |
| DD[10] | 23.29 | 24.71 |

EXAMPLE 3

FIG. 7 shows the lens configuration of the projection zoom lens of Example 3 at each of the wide angle end and the telephoto end. The schematic configuration of the projection zoom lens of Example 3 is the same as that of Example 1. The detailed configuration of the projection zoom lens of Example 3 is shown in Table 3, and aberration diagrams are respectively shown in A through J of FIG. 8.

TABLE 3

EXAMPLE 3

(a)

| Si | Ri | Di | Ndj | νdj |
|---|---|---|---|---|
| 1 | 128.5493 | 1.40 | 1.67003 | 47.23 |
| 2 | 22.8607 | DD[2] | | |
| 3 | 224.2986 | 3.54 | 1.77250 | 49.60 |
| 4 | −41.6267 | 0.20 | | |
| 5 | 17.4353 | 6.58 | 1.67003 | 47.23 |
| 6 | 32.9717 | 4.56 | | |
| 7 | −33.1782 | 6.21 | 1.80518 | 25.42 |
| 8 | 17.7664 | 0.44 | | |
| 9 | 29.8904 | 4.13 | 1.77250 | 49.60 |
| 10 | −20.7160 | DD[10] | | |
| 11 | ∞ | 1.05 | 1.51680 | 64.20 |
| 12 | ∞ | 0.69 | | |
| 13 | ∞ | | | |

(b)

| | Wide Angle End | Telephoto End |
|---|---|---|
| Zoom Ratios | 1.0 | 1.1 |
| f | 21.88 | 24.07 |
| Bf | 24.68 | 26.10 |
| Fno. | 2.40 | 2.55 |
| 2ω[°] | 54.47 | 49.63 |
| DD[2] (inf) | 31.93 | 27.23 |

TABLE 3-continued

EXAMPLE 3

| | | |
|---|---|---|
| DD[2](2.37 m) | 32.65 | 27.95 |
| DD[10] | 23.29 | 24.71 |

Table 4 shows values corresponding to the above conditional expressions (1) through (3) of Examples 1 through 3. In Table 4, Nd1 is the refractive index with respect to the d-line of the first lens L1, Nd2 is the refractive index with respect to the d-line of the second lens L2, and Nd3 is the refractive index with respect to the d-line of the third lens L3.

TABLE 4

| | EXAMPLE 1 | EXAMPLE 2 | EXAMPLE 3 |
|---|---|---|---|
| Formula (1) Nd1 | 1.67003 | 1.67003 | 1.67003 |
| Formula (2) Nd2 | 1.67003 | 1.77250 | 1.77250 |
| Formula (3) Nd3 | 1.77250 | 1.67003 | 1.67003 |

The present invention has been described with reference to the Embodiments and Examples. The present invention is not limited to the embodiments and the examples described above, and various modifications are possible. For example, values, such as the radius of curvature, the distances between surfaces, the refractive indices, the Abbe numbers of each lens element, and the like are not limited to the values in the numerical examples shown in the Tables, but may be other values.

Further, the projection type display device of the present invention is also not limited to the configurations described above. For example, the light valves to be used and optical members used for the beam separation or beam composition are not limited to the above configurations, and various modifications are possible.

What is claimed is:

1. A projection zoom lens substantially consisting of two lens groups which are a first lens group having negative refractive power and a second lens group having positive refractive power, arranged in this order from the magnification side, the first lens group substantially consists of one lens which is a first lens composed of a negative meniscus lens with a convex surface toward the magnification side;

the second lens group substantially consists of four lenses which are a second lens that is a positive lens, a third lens which is a positive meniscus lens with a convex surface toward the magnification side, a fourth lens which is a negative lens, and a fifth lens which is a positive lens, arranged in this order from the magnification side;

the first lens group and the second lens group are moved in the direction of the optical axis while changing magnification;

at least one of the positive lenses in the two lens groups has an Abbe number and a refractive index that each falls within a range that satisfies the condition wherein the refractive index is lower than that of a straight line which passes through two points which are (νd,Nd)=(55,1.65) and (νd,Nd)=(34,1.75) in an orthogonal coordinate system having Abbe numbers νd with respect to the d-line as the horizontal axis and refractive indices Nd with respect to the d-line as the vertical axis; and conditional expressions (1) through (3) below are satisfied:

$$Nd1 < 1.70 \quad (1)$$

$$Nd2 > 1.65 \quad (2)$$

$$Nd3 > 1.65 \quad (3),$$

where
- Nd1: the refractive index with respect to the d-line of the first lens,
- Nd2: the refractive index with respect to the d-line of the second lens, and
- Nd3: the refractive index with respect to the d-line of the third lens.

2. A projection type display device comprising
a light source;
a light valve which light from the light source enters; and
the projection lens of claim 1 which projects optical images generated by light modulated by the light valve onto a screen.

3. The projection zoom lens of claim 1, wherein the second lens has an Abbe number and a refractive index that each falls within the range.

4. The projection zoom lens of claim 1, wherein the third lens has an Abbe number and a refractive index that each falls within the range.

* * * * *